INVENTOR.
SAMUEL V. CRAVENS

BY Robert W. Beach

ATTORNEY

INVENTOR.
SAMUEL V. CRAVENS
BY
Robert W. Beach
ATTORNEY

Feb. 6, 1968 S. V. CRAVENS 3,367,502

MATERIAL-SUSPENDING AIR CURRENT DIFFERENTIAL DENSITY SEGREGATING APPARATUS

Filed April 17, 1967 9 Sheets-Sheet 3

INVENTOR.
SAMUEL V. CRAVENS

BY Robert W. Beach

ATTORNEY

INVENTOR.
SAMUEL V. CRAVENS
BY
Robert W. Beach
ATTORNEY

INVENTOR.
SAMUEL V. CRAVENS
BY Robert W. Beach
ATTORNEY

Feb. 6, 1968 S. V. CRAVENS 3,367,502

MATERIAL-SUSPENDING AIR CURRENT DIFFERENTIAL DENSITY SEGREGATING APPARATUS

Filed April 17, 1967

9 Sheets-Sheet 6

INVENTOR
SAMUEL V. CRAVENS

BY
Robert W. Beach

ATTORNEY

INVENTOR
SAMUEL V. CRAVENS
BY
Robert W. Beach
ATTORNEY

Feb. 6, 1968 S. V. CRAVENS 3,367,502

MATERIAL-SUSPENDING AIR CURRENT DIFFERENTIAL DENSITY SEGREGATING APPARATUS

Filed April 17, 1967 9 Sheets-Sheet 8

INVENTOR.
SAMUEL V. CRAVENS

BY Robert W. Beach

ATTORNEY

INVENTOR.
SAMUEL V. CRAVENS
BY
Robert W. Beach
ATTORNEY

United States Patent Office 3,367,502

Patented Feb. 6, 1968

3,367,502

MATERIAL-SUSPENDING AIR CURRENT DIFFERENTIAL DENSITY SEGREGATING APPARATUS

Samuel V. Cravens, 3224 NE. 42nd Ave., Portland, Oreg. 97213

Continuation-in-part of application Ser. No. 300,784, Aug. 8, 1963. This application Apr. 17, 1967, Ser. No. 631,373

14 Claims. (Cl. 209—467)

ABSTRACT OF THE DISCLOSURE

Each one of a series of segregators includes an upper chamber for receiving fine material separated from a lower air chamber by an air-permeable partition. A variable speed propeller in the lower chamber propels air into the upper chamber while the upper portion of the casing is vibrated by an unbalanced shaft rotating about an upright axis. Material supplied to the lower portion of the upper compartment is separated into light material discharged from the upper portion of the compartment and heavier material discharged periodically as concentrates through valves in the lower portion of the upper compartment. A rotatable contact cylinder controls the timed opening of the lower valves of the unit.

This application is a continuation-in-part of my copending application Ser. No. 300,784, filed Aug. 8, 1963, now abandoned, for Material-Suspending Air Current Differential Density Segregating Apparatus.

The principle of segreating finely divided particles of different density by suspending a body of such particles in an air current is not new, but the principal disadvantages of apparatus used heretofore for this purpose has been that such apparatus has not operated continuously but has processed such material in batches requiring interrupted and intermittent operation of the apparatus. Moreover, such apparatus has been slow in operation and of relatively small capacity. An advantage of air current suspension differential density segregation is that it is not necessary to wet the body of finely divided material and subsequently to dry it, as is required in the wet flotation process of concentrating ore. On the other hand, it is not necessary that the finely divided material be perfectly dry to utilize the air suspension differential density process effectively, especially if the particles of the material have not been pressed together.

It is therefore a principal object of the invention to provide apparatus for segregating finely divided material particles of different density by the air current suspension principle by continuously feeding mixed density material to it and virtually continuously removing segregated material from it in at least one range of density.

A further object is to perform such air current suspension segregating process rapidly, yet sufficiently accurately to be entirely practical, and by the use of apparatus which can be constructed and operated economically.

Another object is to provide apparatus which will perform an air current suspension separating operation on material sufficiently finely divided as to include a considerable amount of dust particles with minimum dispersion of such dust particles into the air outside of the apparatus, which would effect contamination of the air. Preferably such material is minus 400 mesh.

A further object is to provide apparatus for performing such air current suspension segregating process which is rugged and durable with few moving parts and requiring a minimum of upkeep despite the abrasive character of the material being processed. It is also an object to arrange units of such apparatus in series so that material can be fed from one unit to the next and to provide control mechanism for regulating the operation of each unit in accordance with the type of material being segregated by it.

These objects can be accomplished by apparatus including principally a large casing preferably of cylindrical cross section with its axis disposed vertically and defining an upper material holding and suspending chamber and a lower air chamber. A propeller or blower in the lower air chamber produces a gentle air current flowing upward, and the two compartments are separated by an air-permeable divider through which air from the lower chamber exudes into the body of finely divided material above such divider. The differential density of the particles in such body of material causes the lighter particles to rise and the more dense particles to settle, so that the material stratifies into strata formed by material particles of respectively different densities. The lighter material rising in the casing is discharged substantially continuously over a peripheral weir while the heaviest or most dense particles are tapped off periodically from a location immediately above the air-permeable divider separating the upper and lower chambers. Segregation of the material is expedited by vibrating the casing at high amplitude by an upright shaft which is rotated while displacing its axis transversely of such axis.

A number of such units can be connected in series so that the lighter material discharged from each unit passes to the next unit and the heavier material discharged from each unit is collected as concentrates. The amount of concentrate material removed from each unit can be regulated by rotary timer mechanism adjustable in accordance with the material being processed.

Figure 1:
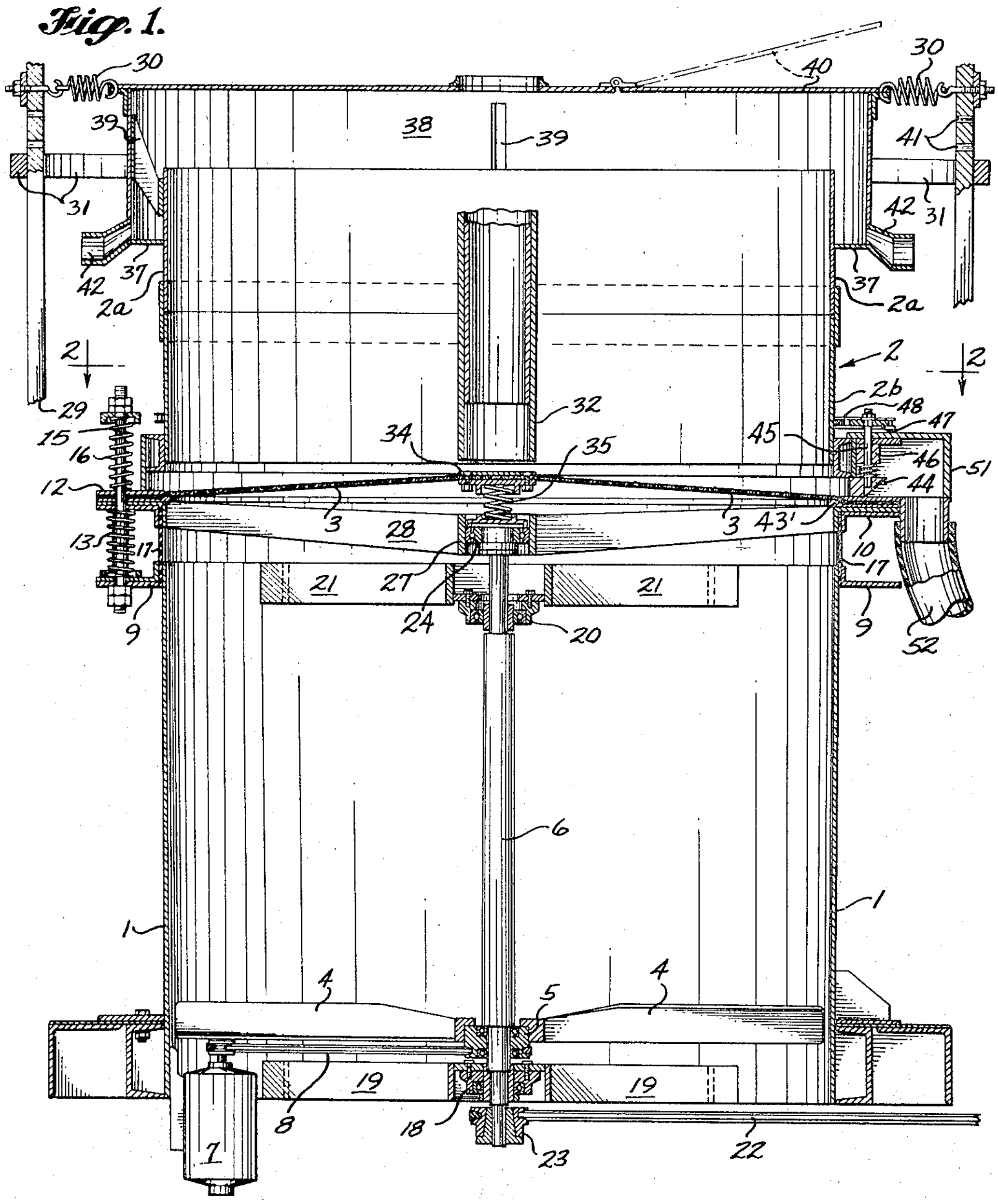
FIGURE 1 is a vertical cross section through segregating apparatus of the present invention and FIGURE 2 is a horizontal section through the apparatus taken on line 2—2 of FIGURE 1.

The segregator casing shown in FIGURE 1 includes a lower air chamber 1 and a holding chamber 2 for finely divided material to be segregated superimposed on the chamber 1. The horizontal cross-sectional size and shape of such chambers can vary considerably and the capacity of the material-holding chamber can be altered by varying its depth. Actually, it is preferred that such material-holding chamber include an upper ring 2*a* which can be fitted onto the upper edge of a lower replaceable ring 2*b*. Several lower rings differing in height can be provided from which that ring having the desired height for the material being processed can be selected. If the apparatus is being used to process ore having a relatively small proportion of values it is preferable to use a deeper ring 2*b* to increase the material-holding capacity of the chamber 2.

The upper and lower compartments 1 and 2 of the segregating apparatus casing are separated by a substantially horizontal divider 3, which preferably is of very flat conical shape providing a slight inclination from the central portion of the divider to every portion of its periphery. Such divider is air-permeable while at the same time being sufficiently strong or reinforced to support the load of material in the upper chamber 2 of the casing when the apparatus is not in operation. Such divider can be made, for example, of closely woven glass fiber filter cloth laid over 20 mesh bronze screen. A current of air generated in the lower air chamber 1 will exude through such a divider into the body of finely-divided material supported by it for the purpose of suspending the particles of such material body to a greater or lesser extent.

In order to effect uniform segregation of particles of the material in the upper chamber 2 of the segregating apparatus it is important that the current of air passing through the divider 3 be substantially uniform over its entire area and irrespective of the depth of the bed of material above the divider or variations in the depth of such material in various parts of the bed on the divider. Consequently, not only should the divider provide considerable resistance to the flow of air through it at high velocity, but the current of air flowing upward to the divider should be of substantially uniform velocity over the entire area of the divider and move in a direction substantialy perpendicular to the divider or parallel to the axis of the casing 1.

The upward current of air through the air chamber 1 preferably is produced by a rotary fan propeller 4 carried by a hub 5 which is rotatably mounted on a shaft 6. Such propeller is driven by a motor 7 connected to the hub 5 by a V-belt 8. Such fan motor 7 preferably is of the variable speed type so that it can be regulated to rotate the fan at a speed within the range of zero to 1200 revolutions per minute. The depth of the air chamber 1 should be sufficient so that the rotational velocity of the air propelled by the fan will have largely been dissipated by the time the air current reaches the divider 3 at the upper end of the air chamber. If desired, louvers may be provided within the air chamber 1 to assist in straightening the air flow produced by the blower before it reaches the divider 3.

The function of the air exuding through the divider 3 is to loosen the body of finely-divided material above the divider and to suspend the material particles of lower density to a greater degree than more dense particles so that the lighter particles will be impellled gradually upward and the more dense particles will settle downward. Such segregating action of the material particles according to their relative density will be expedited by vibrating the body of material. Such vibration of the material can be effected by vibrating laterally at least the upper portion 2 of the casing which confines the body of material. The upper section 2 of the casing is therefore supported on the lower casing section 1 by structure enabling the upper section to move laterally relative to the lower section, as distinguished from toward and away from the lower section. Actually the upper section is moved in a universal lateral manner relative to the lower section within limits.

On the upper end of the lower casing section 1 is secured a flange 9 on which the upper section 2 of the casing is supported. Such upper casing portion includes a lower flange 10, shown in FIGURES 1 and 6, which is secured by bolts 11, shown in FIGURES 2 and 6, to a superposed flange 12. The edge portion of the divider 3 is received and clamped between the two flanges 10 and 12 by such bolts. Flanges 10 and 12 are supported from flange 9 resiliently by helical compression springs 13 spaced circumferentially of the flanges, which may be four in number, arranged 90 degrees apart. It is preferred that the approach of flange 10 to flange 9 be limited positively by spacer tubes 14 shown in FIGURE 5, disposed concentrically within the springs 13 and having their opposite ends engaged respectively with such flanges when the load of material in the upper section is sufficiently great.

Each spring 13 is held compressed to a length not appreciably exceeding the length of the spacer tube by a long bolt 15 extending through the spacer tube 14 and a second helical compression spring 16 arranged coaxially with spring 13 and disposed above and having its lower end bearing on the upper flange 12. The bolt 15 extending through both springs balances the weight of the upper casing section 2 and the force of springs 16 against the force of springs 13 approximately while enabling the flanges 10 and 12 to move up and down in opposite directions snubbed by the force of such springs. The holes in flanges 9, 10 and 12 are sufficiently larger than the bolt 15 as to enable such bolt at each location to shift or tilt enough to afford a reasonable amplitude of vibration laterally for the upper casing section 2 relative to the lower casing section 1. The upper edge of the lower casing section and the lower edge of the upper casing section are interconnected by a resiliently stretchable web 17 shown in FIGURES 1 and 5 which closes the space between such sections without interfering appreciably with their relative movement.

Figures 5, 6, 7:
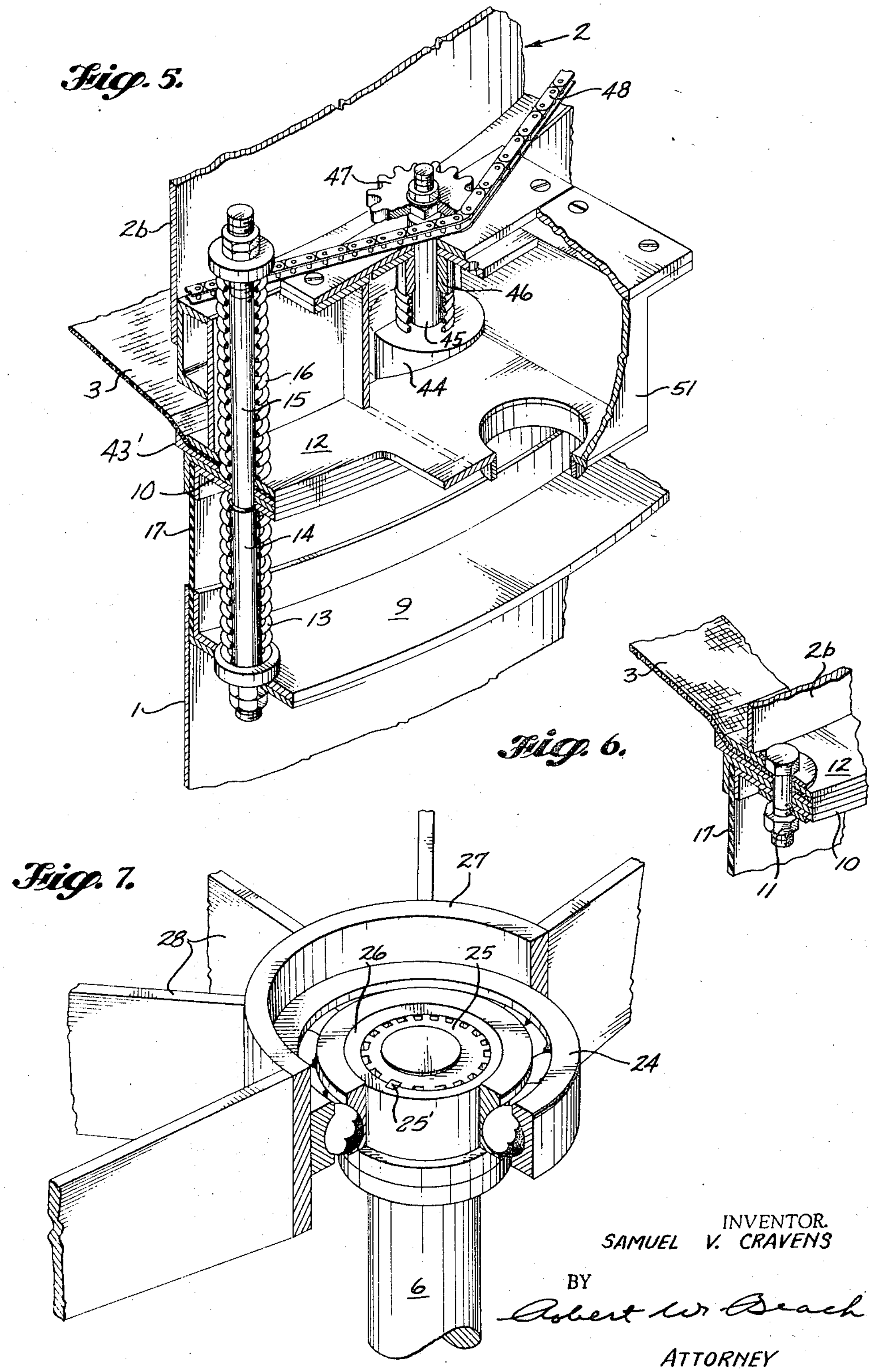
FIGURE 5 is a top persepective of a fragmentary portion of the segregating apparatus.
FIGURE 6 is a top perspective of a detail portion of the apparatus and FIGURE 7 is a top perspective of another detail of the apparatus.

The lower end of shaft 6 is supported by an anti-friction bearing 18 mounted in a spider 19 and the upper end of this shaft is held by an antifriction bearing 20 mounted in an upper spider 21. Such bearings 18 and 20 therefore maintain accurate vertical alignment of the shaft. Rotation of the hub 5 by motor 7 does not effect rotation of the shaft, but such shaft is rotated by a variable speed drive belt 22 engaging a pulley 23 to rotate it at a speed of 2500 to 3500 revolutions per minute for the purpose of effecting vibration of the upper casing section. As shown in FIGURE 7, the upper end of shaft 6 carries an antifriction bearing 24, the axis of which is offset from the axis of shaft 6 to any desired degree within limits, depending upon the relative circumferentially adjusted positions of the internal eccentric ring 25, which is secured to the end of shaft 6 and fits within the outer eccentric ring 26. Such rings are held in the proper rotative relationship depending upon the degree of eccentricity desired between the axis of shaft 6 and the axis of bearing 24 by a key 25' connecting the two eccentric rings and fitting into any selected one of a number of circumferentially spaced grooves in one of such rings.

Bearing 24 fits within the central ring 27 of a spider 28 which is mounted in the bottom of the upper casing section 2. As shaft 6 is rotated, therefore, the axis of such bearing will trace a circle around the axis of shaft 6 and the radius of such circular locus will be determined by the relative adjustment of eccentric rings 25 and 26. The orbital movement of the inner race of bearing 24 will effect lateral displacement of the upper casing section 2 relative to the axis of shaft 6 and the lower casing section 1, which displacement progresses circumferentially in accordance with the speed of rotation of shaft 6. The severity of the vibration to which the upper section 2 is thus subjected can be altered either by varying the speed of rotation of shaft 6 or by altering the degree of eccentricity of bearing 24 relative to the shaft, or both.

During vibration of the upper section 2 of the segregating apparatus casing, the upper portion of such section can be steadied by connecting its periphery to stationary posts 29 by tension springs 30 extending radially of the casing and spaced circumferentially around it. Such posts can be connected by a circular band 31 providing mutual support. The springs 30 tend to damp the vibration of the upper portion of the casing, which is not objectionable because the vibration of the lower portion of the upper casing section is most effective to facilitate the material segregating operation.

Figure 8:
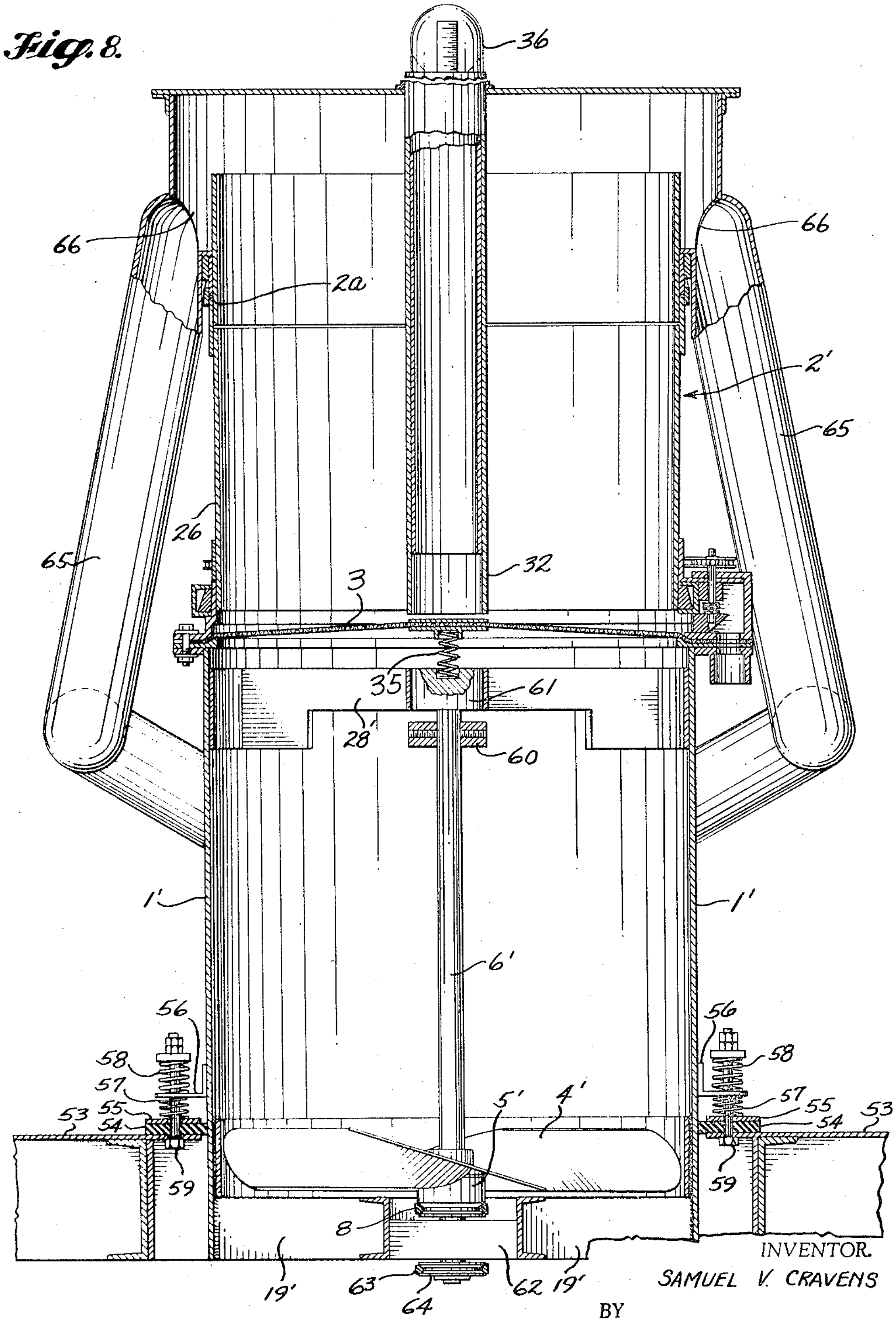
FIGURE 8 is a central vertical section through another embodiment of segregating apparatus according to the present invention.

The purpose of the material segregating operation is to recover the particles of greatest density from the body of material, which represent most of the mineral content of ore, or to segregate the heaviest mineral fraction from less dense minerals. In such an operation it is desirable to cause less dense particles to rise from the more dense particles by being suspended by the current of air flowing upward through the air-permeable divider 3. Consequently, it is advantageous to supply the material to be segregated at a location adjacent to the divider. For this purpose a material supply tube 32 extends down into the central portion of the upper chamber to a location close to the divider. Such material supply tube preferably is of telescoping construction, as shown in FIGURE 8, so that the elevation of its lower end relative to the divider 3 can be adjusted.

Figure 3:
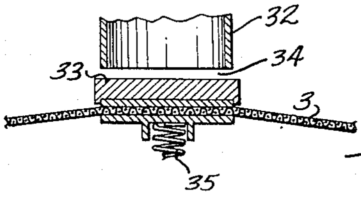
FIGURE 3 is a vertical section through a detail of the apparatus and FIGURE 4 is a vertical section through another detail.

To enable the spacing of the lower end of the material supply tube 32 to be located a greater or lesser distance above the divider 3 while still restricting the passage from the supply tube to the material-holding chamber, a filler block 33 of any desired thickness can be mounted on the central portion of the divider, as shown in FIGURE 3. The elevation of the lower end of the material supply tube 32 can then be adjusted relative to this block to provide the annular feed slot 34 of desired width. Material supplied by the tube 32 cannot jam in this slot because the central portion of the divider is resiliently supported by the compression spring 35 which bears on the spider 28, such as being supported by the outer race of the bearing 24. The finely divided material, such as minus 400 mesh, is supplied to the upper end of the telescoping feed tube by a screw conveyor 36 from any suitable storage facility.

After being segregated in the upper chamber 2 the less dense material is discharged over the rim of the upper casing ring *2a* into an annular trough 37 forming part of the top closure structure 38. Such closure structure is mounted on the upper portion of ring *2a* by brackets 39 and the springs 30 are connected to this closure structure. The top of such structure has in it an inspection and sampling opening closed by a hinged door 40 shown in FIGURE 1. The central portion of this structure is apertured for passage of the feed tube 32. Such feed tube can be adjusted lengthwise not only to alter the width of the material discharge slot 34, but also to accommodate casing rings *2b* of different height depending upon the total height of the upper casing section 2 desired for a particular operation. The supporting posts 29 have holes through them at different elevations to receive the anchoring bolts of springs 30 in the proper position depending upon the width of the ring *2b* being used.

Less dense material spilling over the upper edge of ring *2a* into trough 37 is moved circumferentially of the covering structure 38 to one or another of the discharge tubes 42, several of which can be provided spaced circumferentially of the trough 37. Material discharged through these tubes can be deposited in a receptacle through hoses connected to such tubes. The most dense material which settles from the finely divided material in the chamber 2 onto the divider 3 works its way down the incline of the divider into the inwardly-opening groove 43 around the marginal portion of the casing shown in FIGURE 4. Such material can be tapped off from the chamber 2 periodically through a plurality of discharge ports, shown best in FIGURES 4 and 5, spaced apart circumferentially of the upper casing section and communicating with the peripheral groove 43. The opening through such a discharge port in each instance is controlled by a rotatable valve 44 of basically cylindrical shape, but which has a lower inclined surface. The effective size of the discharge port is regulated by the rotative position of valve 44. When the wider side of the valve faces inward the port is closed completely.

Figure 2:
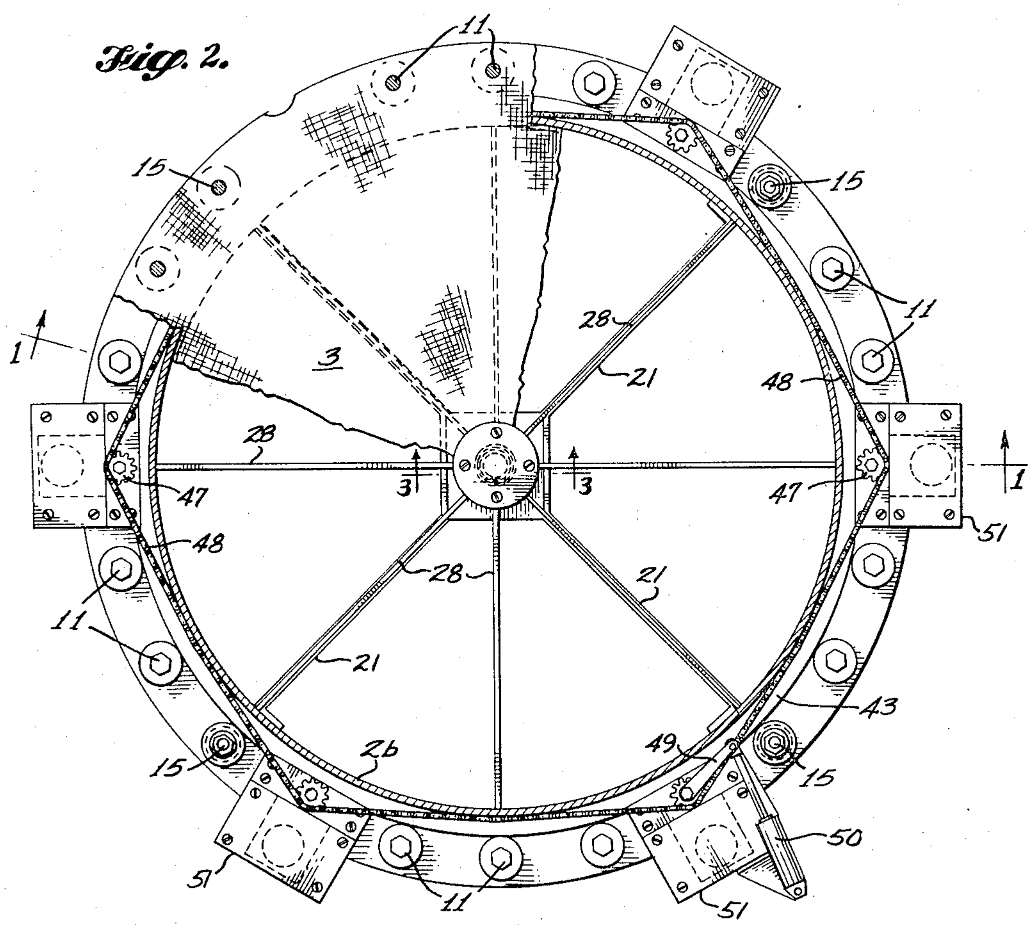
Figure 4:
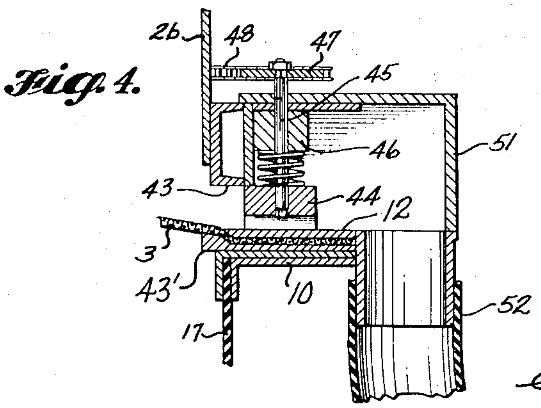

Each valve 44 is supported for rotation by a valve stem 45 extending upward from the valve and mounted in a bearing 46, as shown in FIGURES 4 and 5. Several of such discharge ports and their control valves are spaced circumferentially of the casing section 2, six of such valve installations being shown in FIGURE 2. It is desirable for all of these valves to be opened and closed simultaneously. For this operation sprockets 47 secured on the upper ends of the valve stems are interconnected by an endless chain 48 encircling the casing and engaged with the several sprockets so that the stretches of chain between adjacent sprockets are straight. Adjustment of the rotative position of one valve will therefore cause chain 48 to effect corresponding rotative adjustment of all of the other valves simultaneously. One of such valves can be adjusted by swinging an arm 49 mounted on its valve stem by a fluid-operated piston and cylinder jack 50 as shown in FIGURE 2.

In order to assist material which has progressed down the incline of the divider 3 into the annular groove 43 to move outward through the disharge ports when the valves 44 are opened, a circumferential flange 43' is provided projecting inwardly from the lower side of the groove 43 beyond the inner side of the casing portion immediately below the divider 3, as shown best in FIGURES 4 and 5. Air moves upward through the lower casing portion 1 by the propeller 4 will curl around such flange so that the air above the flange will be directed outwardly as well as upwardly. Such outward movement of the air will sweep material from the groove 43 out through the discharge ports and will assist in scavenging from the portions of the groove between the discharge openings denser material which has lodged in such groove portions.

Material passing through the discharge ports into the antechambers 51 can pass through hoses 52 into suitable mineral collecting receptacles. While the valve actuator 50 can be controlled manually at will such actuator can be time-operated automatically so that it will rotate the valves 44 to open positions periodically and hold them in such positions for a predetermined interval. The frequency of such valve operation and the duration of valve opening will depend upon the proportion between the values and the gangue in ore which is being concentrated. Typically, the actuator 50 may move the valves to open position every 3 or 4 minutes and leave the valves open for a period of 3 or 4 seconds.

While the apparatus described above could be used for various purposes it is particularly useful for separating mineral particles or mineral-bearing particles from gangue in concentrating the ore. To effect the required segregation the ore must be in finely divided form, such as minus 400 mesh. A convenient method for producing material in suitable form is to disintegrate the ore in accordance with the process and apparatus disclosed in United States Patent 3,285,951 for Counterrotating Disk Cohesive Material Disintegrator. Subjection of such finely divided ore to a current of air and vibration simultaneously in the material-holding chamber 2 will cause the less dense particles to be suspended by the air and to rise until they have been elevated above the lip of the ring *2a*, and move outward over such lip into the trough 37. The more dense mineral particles will settle onto the divider 3 and work their way down its incline to the periphery of the material-holding chamber for discharge through the outlet ports.

Air propelled upward by the fan 4 and passing through the air-permeable divider 3 will progress upward through the body of material as a gentle current to loosen the material and effect its stratification according to density and eventually will be discharged above the body of material in the ring 2*a*. Such air current will flow against the covering structure 38, which will compel the air to change its direction of movement to generally radially outward and then downward for discharge through the tubes 42 or other air discharge apertures in the side of the covering structure. Because of the change in direction of the air flow most of the airborne dust particles carried out of the body of ore will be precipitated from the air back into the material body before the air is discharged from the covering structure 38. If desired, such air can be recirculated through the apparatus, but it would be preferable to filter such air before thus recirculating it in order to reduce the possibility of clogging the pores in the air-permeable divider 3.

The segregating apparatus of the present invention is more particularly adapted for classifying minerals of different density, such as of different metals, in the embodiment illustrated in FIGURE 8. The structure of this apparatus in general is the same as that shown in FIGURES 1 and 7, inclusive, and consequently corresponding parts have been labelled with the same numerals and operate in a similar manner so that it should be unnecessary to repeat the description of these features. In this instance, however, the lower section 1' and the upper section 2' of the casing are not connected together to enable them to move relatively, but such sections are secured together rigidly. The entire casing is, however, yieldably supported for vibratory movement relative to the base 53. An aperture in the base receives the lower end of the casing and a cushioning ring 54 is provided on the base extending around the margin of such aperture. A rigid clamping ring 55 seats on the resilient ring 54.

The segregating apparatus casing is supported by brackets 56 which rest on helical compression supporting springs 57 interengaged between the respective brackets and the ring 55. Such springs are held under compression by compression springs 58 on top of the brackets 56. Bolts 59 extend through the springs 57 and 58 and the brackets 56 to maintain the springs under a desired degree of compression to resist vibratory movement of the casing. The casing as a whole is then vibrated by the effect of the unbalanced flywheel 60 mounted on the shaft 6' which is journaled in the upper bearing 61 and the lower bearing 62. Such bearings are mounted in spiders anchored to the lower casing section 1', the upper bearing being mounted in spider 28' and the lower bearing being mounted in spider 19'. The shaft 6' is rotated by a drive belt 63, the speed of such drive being variable. Particularly it is desirable to provide a greater amplitude of agitation for the concentrator shown in FIGURE 1 than for the mineral classifier of FIGURE 8. Thus, the vibration of the casing of the FIGURE 8 classifier would be more rapid and of less amplitude than the vibration of the concentrator of FIGURE 1. Thus belt 63 turns the pulley 64 on the lower end of shaft 6' at a speed of 2500 to 4500 revolutions per minute. The propeller 4' is carried by the bearing 5' which is mounted on shaft 6' to enable the propeller to be turned relative to the shaft. Rotation of the propeller is effected by belt 8. The speed of the fan 4' can be regulated from a very slow speed to about 1200 revolutions per minute to provide the most effective air current for segregating the particular material being processed.

The arrangement for supplying material to and discharging material from the upper material-holding chamber 2' is similar to that described in connection with the apparatus shown in FIGURE 1. In this instance, however, pipes 65 are included which receive the less dense material from the upper spouts 66 of the covering structure 38.

Figure 9:
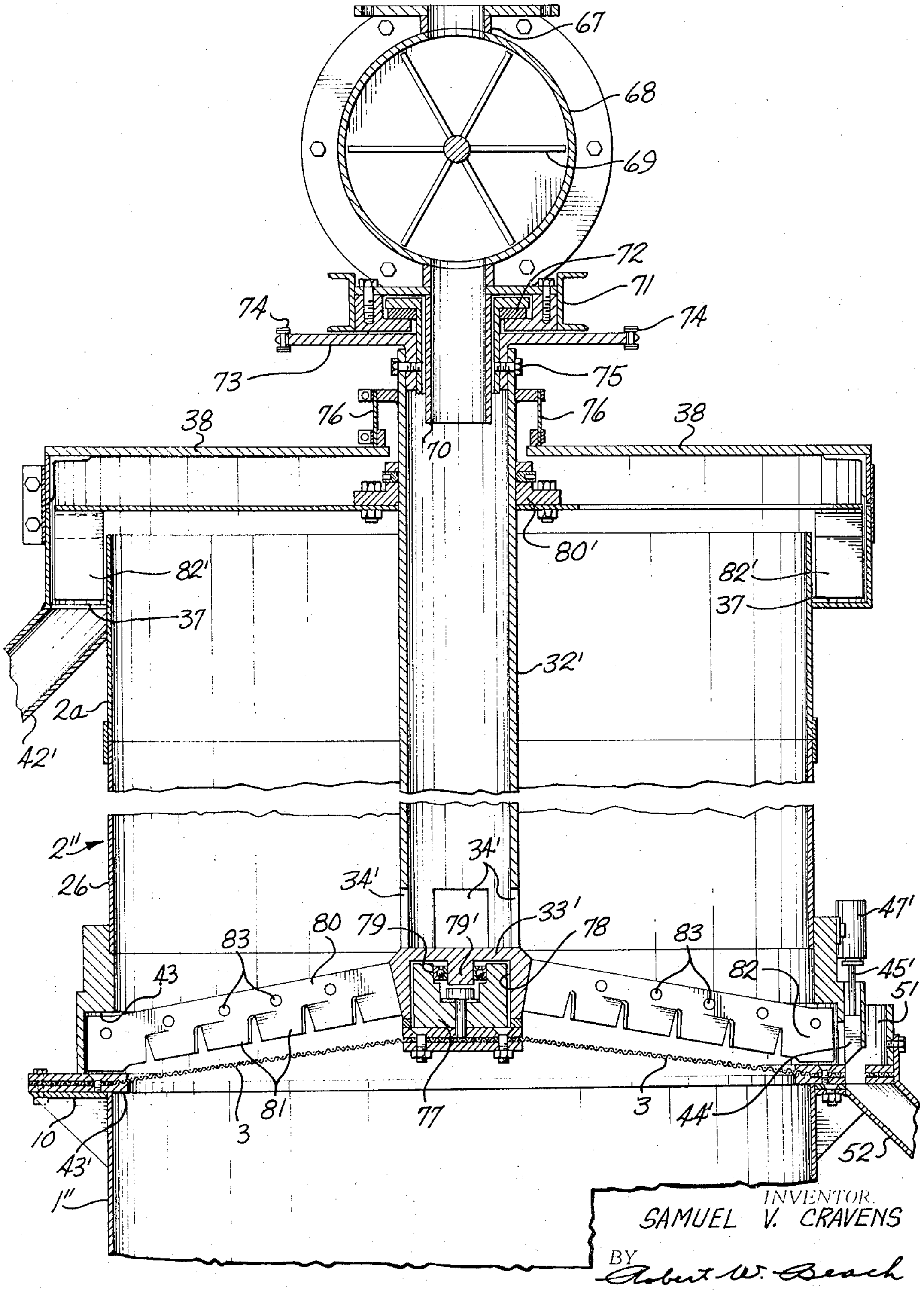
FIGURE 9 is a central vertical section through the upper portion of still a different embodiment of segregating apparatus according to this invention.

The segregating device shown in FIGURE 9 is generally of the same type shown in FIGURES 1 and 8 in that it includes an upper section 2'' for holding material and a lower casing part 1'' forming an air chamber. Such lower casing portion can be similar either to the lower casing portion 1 of the segregating device shown in FIGURE 1 or the lower casing portion 1' shown in FIGURE 8. Either type of propeller for moving the air upward through the air chamber and either type of vibrating mechanism for vibrating the upper casing portion 2'' can be used. Moreover, a compression spring 35 can support the central portion of the horizontal divider 3. Having been described previously, such structure is not duplicated in the illustration of FIGURE 9.

The principal difference in the segregating device of FIGURE 9 over that shown in FIGURES 1 and 8 is in the mechanism for feeding the material through the segregator. Such material is supplied from an inlet pipe or hopper 67 through a compartmented rotary feeder 68 which serves to seal the source of supply of the material from the segregator. The quantity of material fed from the source of supply into the segregator is under positive control at all times because the rotary radial vanes 69 provide a positive partition between the supply pipe or hopper 67 and the pipe 70 leading into the segregator.

The rotary feeder 68 is supported stationarily by a suitable supporting frame 71. In this instance the feed pipe 32' extending axially upright through the upper section 2' of the segregator is rotatable about its axis. The upper end of this feed pipe is rotatively supported by an antifriction thrust bearing 72. A sprocket 73 driven by a roller chain 74 is secured by bolts 75 to the feed pipe for rotating it. Such pipe also carries a rotary seal 76 for providing a seal between the rotating feed pipe and the top closure structure 38. As the feed pipe is rotated, material supplied to it through the rotary feeder 68 will move down through it. The rotative speed of such feed pipe and the speed of rotation of the feeder vanes 69 should be generally synchronized.

The central portion of the divider 3 carries an upstanding boss 77 over which a cavity 78 in the lower end of the rotary feed pipe 32 fits. The lower end 33' of this feed pipe carries an antifriction bearing 79 encircling a boss 79' formed in the cavity 78, which maintains the lower end of the feed pipe centered. Such feed pipe carries a lower rotor 80 and an upper rotor 80' within the upper casing section 2'' for the purpose of moving material circumferentially of the casing. The lower portion of the rotor 80 is slit upward from its lower edge to form tabs 81 which are twisted, as shown best in FIGURES 9 and 13, for the purpose of propelling material radially outward as the rotor turns.

Figures 13, 14:
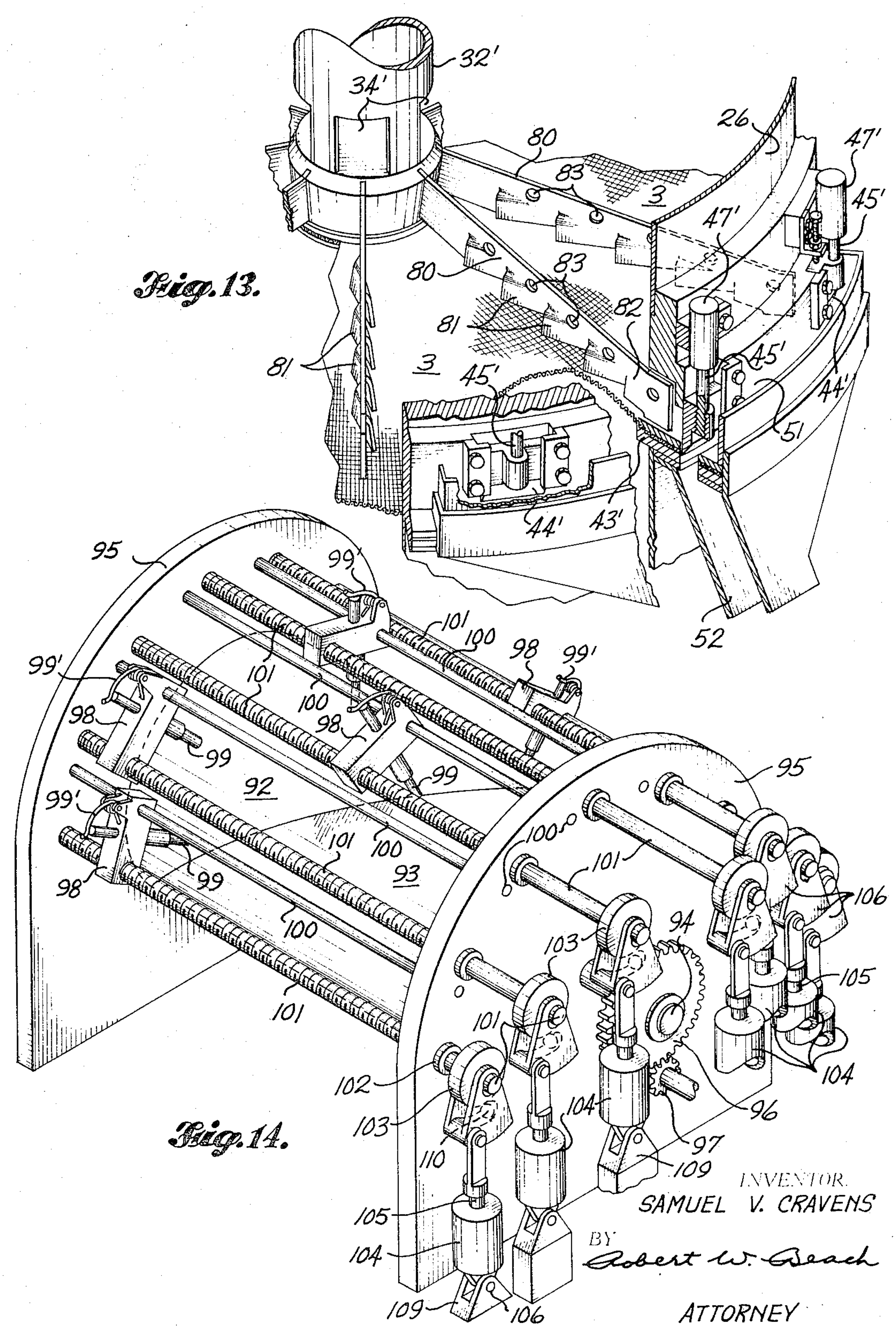
FIGURE 13 is an enlarged fragmentary top perspective of a portion of the segregator unit shown in FIGURE 9.
FIGURE 14 is a top perspective of control mechanism for gates such as shown in FIGURE 13 for controlling discharge of material from a series of segregator units, such as shown in FIGURES 10 and 11.

The outer ends 82 of the rotor are received in the annular groove 43 for the purpose of scraping the denser material circumferentially of this groove toward discharge openings controlled by valves 44'. Preferably a plurality of such valves are located in a group at one location circumferentially of the segregator, as shown in FIGURE 13. Such valves will be opened intermittently for flow of segregated material through the discharge openings into the discharge chute 52. A valve stem 45' secured to each valve 44' can be reciprocated by a fluid piston and cylinder or solenoid 47' as frequently and to open the valve as widely as may be desired from time to time to effect proper discharge of denser materials from the lower portion of the segregator upper section 2''.

As discussed in connection with the segregators shown in FIGURES 1 and 8 the air moving upward through the air-permeable partition 3 and vibration of the upper casing section 2'' will effect upward movement of the lighter portions of the fine material so that they tend to flow over the upper edge of the upper wall portion 2*a* into the trough 37. Blades 82′ carried by the arms 80′ attached to the rotary feed pipe 32′ depend into the trough 37. As the feed pipe rotates, therefore, such blades will scrape lighter material in the trough circumferentially to the discharge pipe 42′. Resistance to rotation of the feed pipe 32′ and its arms can be reduced by providing apertures 83 in the arms 80 through which material can flow instead of all of the material in the lower portion of the upper casing section 2″ being pushed circumferentially of the upper section by the rotating arms.

Figure 10:
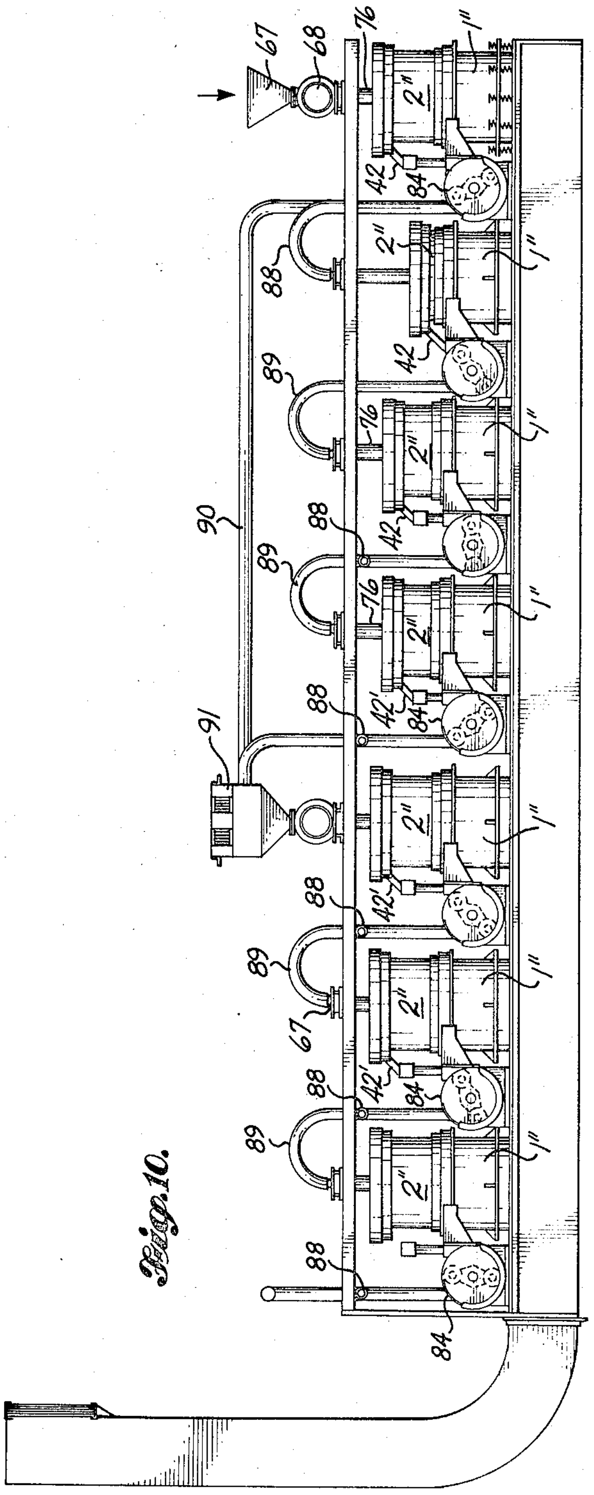
FIGURE 10 is a side elevation of a series of disintegrator units interconnected for flow of material from one to the next.
Figure 11:
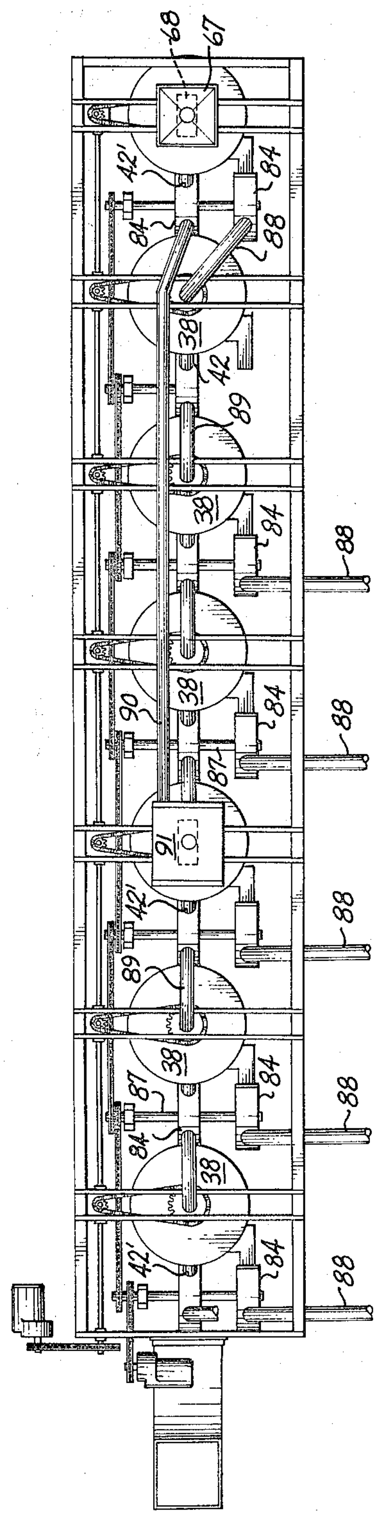
FIGURE 11 is a plan of such series of segregator units.

In classifying ore several segregating devices generally of the type shown in FIGURES 1, 8 or 9 can be used. The first of such segregators can remove the heaviest values, the next segregator can remove the next heaviest values and so on for however many separate removing operations may be desirable. In FIGURES 10 and 11, a series of seven such segregators is shown. After particles of a more dense mineral have been removed the entire overflow mineral from each segregator unit can be supplied to the next segregator unit in the series to the left, as seen in FIGURES 10 and 11, in which the next dense fraction will be removed. The mixture of minerals discharged from that segregator will then be fed to the next segregator unit. This process will be repeated until the original concentrate has been separated into the desired number of fractions depending upon the number indicated to be desirable by an assay.

Figure 12:
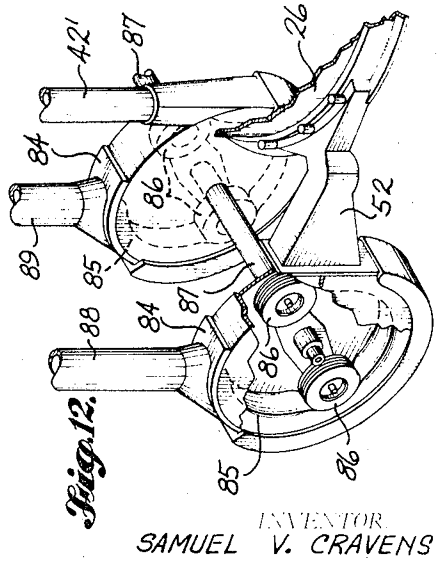
FIGURE 12 is a top perspective of pump elements between adjacent segregator units of the series shown in FIGURES 10 and 11 with parts broken away.

In the series of segregator units shown in FIGURES 10 and 11 the dense fraction and the remaining lighter fraction are moved to the next station by suitable pumps 84 which are illustrated in more detail in FIGURE 12. Such pumps can, for example, include a flexible and compressible tube 85 along which rollers 86 are rolled to compress the tube locally and squeeze the material along the tube. Such rollers are mounted on the crossbar of a rotative shaft 87. The more dense concentrate delivered to such a pump by the outlet pipe 52 from a segregator unit will be moved through a duct 88 to a suitable storage compartment and the lighter components from each outlet pipe 42′ will be pumped through a pipe 89 to the inlet of the next segregating unit in the series. The upper casing sections of the segregators assembled in such series are sealed units of the type shown in FIGURE 9, so that the fluidizing air supplied to the upper casing section of each unit through the floor 3 is discharged from such casing mixed with the heavier and lighter components of the material to maintain them in sufficiently fluid condition to be pumped by pumps of the tube-squeezing type represented by the pumps 84.

If desired, the gangue can be separated from ore-containing mixing minerals by the first segregating unit at the right of FIGURES 10 and 11. The lighter components of the material, which are nonmetalic gangue, are conveyed by a pipe 90 to an intermediate storage hopper 91 where the air is bled from the gangue through an air filter before the gangue is processed through a further series of segregators for separation of its components of different density. The mineral-bearing ore discharged from the bottom of the upper casing section of the first segregator is pumped to successive ore-component segregators. By making such initial segregation it is not necessary to move the gangue through all of the segregators by which the various minerals are separated.

As has been mentioned previously, the outlet valves 44 or 44′ will be opened periodically for a relatively short time to enable the more dense material to be discharged from the segregator units. Where a series of segregator units is utilized it will be desirable to have the periods of discharge valve openings differ in the several units. The periods during which the various discharge valves are open can be programmed by the mechanism shown in FIGURES 14 and 15. Such mechanism includes a rotatable drum 92 having a section 93 of its surface made of electrically conductive material. An inclined or spiral line will separate the nonconductive portion of such drum from the conductive portion. Such drum is rotatively supported by a shaft 94 in stationary end plates 95. The drum can be rotated slowly at a predetermined speed by a drive gear 96 mounted on the shaft 94 which is driven by a pinion 97.

Figure 15:
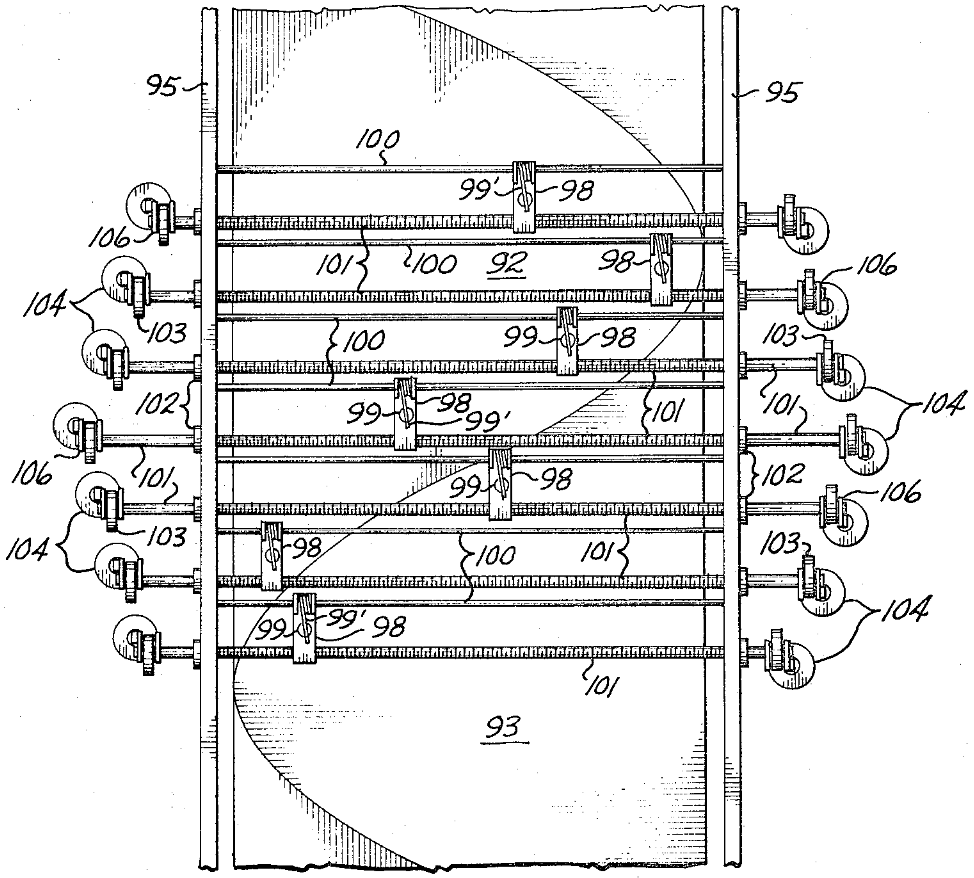
FIGURE 15 is a developed view of the control mechanism shown in FIGURE 14.

The valve-opening devices 47′ whether of the solenoid type or of the fluid jack type can be electrically controlled by circuits switched by the mechanism shown in FIGURES 14 and 15. In the valve circuit for each segregator unit a brush is included which is mounted on a brush-supporting block 98. The brush 99 is movable axially through the block 98 so that its inner end will engage the circumference of the drum 92, 93. The brush is held in contact with the drum by a spring 99′. The block 98 is supported for movement axially of the drum 92, 93 by a rod 100 and a screw 101 which are mounted in parallel relationship between the drum-supporting end plates 95. Each screw 101 is threaded in its brush mounting block 98 and is rotatively mounted in collars 102 on the end plates 95. These screws can then be rotated at will to adjust the location of each brush-mounting block along its screw. The position of such brush lengthwise of the drum will determine the period during the rotation of the drum in which the circuit will be closed to energize the valve-opening device 47′ for holding open a discharge valve 44′.

Figures 16, 17:
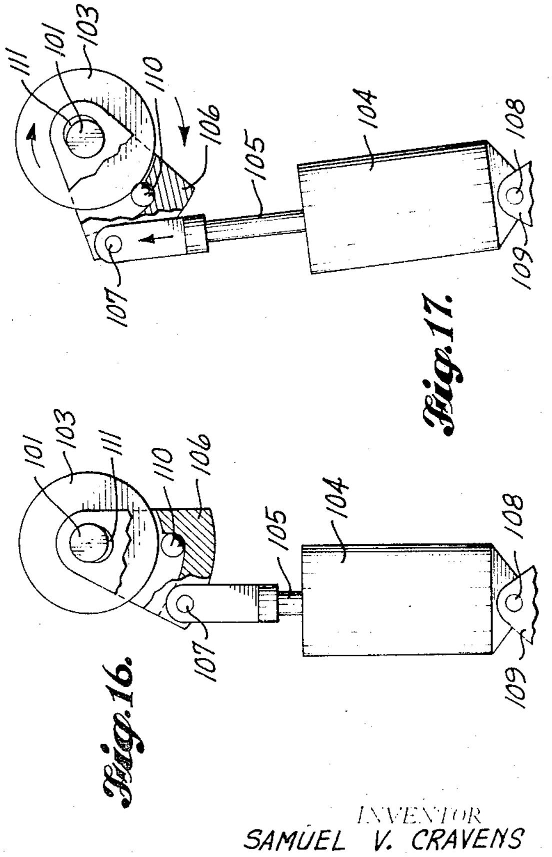
FIGURE 16 is a detail elevation of a portion of the control mechanism shown in FIGURE 14 with parts broken away.
FIGURE 17 is a similar view of such element with its parts shown in different positions.

Adjustment of each valve mounting block 98 along itsc screw 101 and supporting rod 100 can be effected by remote control mechanism such as shown in FIGURES 14, 16 and 17. A disk 103 mounted on an end of a screw 101 can be turned incrementally by energization of a solenoid or fluid jack 104. Such solenoid or fluid jack reciprocates a plunger 105 each time the solenoid or fluid jack actuator is energized. The plunger 105 is connected to an oscillating yoke 106 by a pivot 107. The opposite end of the solenoid or fluid jack actuator 104 is swingably mounted by a pivot 108 on a suitable supporting base 109. As the plunger 105 is projected from the actuator it will press the yoke 106 toward the roller 103. Such yoke has in it a recess in which a roller 110 is located.

As the yoke is moved from the position of FIGURE 16 to that of FIGURE 17, the yoke will be pressed toward the screw shaft 101 because of the aperture 111 in the yoke through which the screw shaft 101 passes being considerably larger than such screw shaft. Consequently, movement of the yoke effected by projection of the plunger will clamp the roller 110 between the yoke and the roller so that swinging of the yoke will rotate the roller 103 and screw shaft 101 incrementally in the clockwise direction as seen in FIGURE 17. When the plunger 105 is retracted into the actuator 104 from the position shown in FIGURE 17 to that of FIGURE 16, however, the yoke 106 will be drawn away from the screw shaft 101 so that the roller 110 will not be clamped between the yoke and the roller 103. Consequently, during movement of the parts from the position of FIGURE 17 to that of FIGURE 16 the roller 103 and screw shaft 101 will not be rotated in the opposite direction. Thus each actuator shown in FIGURE 16 and FIGURE 17 serves as a oneway clutch. Such an actuator will, however, be provided on each end of each screw 101 so that the screw can be turned voluntarily by predetermined increments in either direction to the extent desired for shifting the brush block 98 in one axial direction or the other, as may be required, to place it in the proper position axially of drum 92, 93 to effect the required timed periodic opening of the respective discharge valves 44′.

The type of apparatus described can be used generally for separating different types of minerals from gangue, or can be used for separating different types of minerals from each other as may be preferred.

I claim:

1. Material-segregating apparatus comprising a casing including a lower casing section, the wall of which forms an air chamber, and an upper casing section, the wall of which forms a material-holding chamber, superimposed on said lower casing section, a generally horizontal floor of air-permeable material in the lower portion of said upper casing section for supporting material in said upper casing section, said upper casing section having a lower dscharge port located immediately above said floor for discharge therethrough from said upper casing section of relatively heavy material, and said upper casing section further having an opening in its upper portion for discharge therethrough of relatively light material, valve means variable to control discharge of material through said lower discharge port, means supporting said upper casing section for movement, vibrating means for vibrating said upper casing section and the material therein supported by said floor including an upright shaft in said lower casing section connected to said upper casing section, means rotating said shaft and means displacing orbitally the upper portion of said shaft during such rotation to effect vibration of said upper casing section, and air supply means operable to blow air from said lower casing section air chamber upward through said floor into said upper casing section material-holding chamber for fluidizing material therein while said upper casing section and said material are being vibrated by said vibrating means, to enable differential density segregation of such material for discharge of heavier components thereof through said discharge port and of lighter components thereof through such opening in the upper portion of said upper casing section.

2. The material-segregating apparatus defined in claim 1, in which the upper casing section has an inwardly-opening groove in its margin immediately above the floor.

3. The material-segregating apparatus defined in claim 1, and a marginal flange projecting inwardly from the inner wall of the upper casing section immediately below the floor to deflect inwardly from the wall of the upper casing section air flowing upward through a marginal portion of the floor.

4. The material-segregating apparatus defined in claim 1, in which the upper casing section has a marginal groove outwardly from its wall and opening inward immediately above the floor, and a marginal flange immediately below the floor projecting inwardly beyond the wall of the upper casing section to deflect inwardly air flowing upward through a marginal portion of the floor for flow outwardly around said flange into such inwardly-opening groove.

5. The material-segregating apparatus defined in claim 1, the valve means being movable between a position closing the discharge port and a position providing a passage through such discharge port, and timing means connected to the valve means and effecting periodic alternate opening and closing movement thereof.

6. The material-segregating apparatus defined in claim 1, including a series of material-segregating units and means connected between units in said series for transferring to one unit for further segregation material discharged through the opening in the upper portion of the upper casing section of another unit of said series.

7. The material-segregating apparatus defined in claim 6, in which the valve means of each material-segregating unit is movable between a position closing its discharge port and a position providing a passage through such discharge port, timing means connected to the valve means of both material-segregating units and effecting periodic alternate opening and closing movements thereof, and remotely-controllable means connected to said timing means for varying independently the duration of alternate opening and closing movement of the valve means for the two material-segregating units.

8. The material-segregating apparatus defined in claim 1, in which the means displacing orbitally the upper portion of the vibrating means shaft includes an eccentric drive connecting such shaft and the upper casing section.

9. The material-segregating apparatus defined in claim 1, in which the means displacing orbitally the upper portion of the vibrating means shaft includes an unbalanced fly-wheel carried by such shaft.

10. The material-segregating apparatus defined in claim 1, and material-supplying means including a conduit extending downward in the central portion of the upper casing section to a location adjacent to the central portion of the floor for supplying finely-divided material to the material-holding chamber.

11. The material-segregating apparatus defined in claim 2, in which the upper casing section is of circular cross section horizontally and the inwardly-opening groove is annular, a scraper arm having its length extending generally radially of the upper casing section and having its outer end extending into the inwardly-opening groove, and means operable to rotate said arm circumferentially of the upper casing section for scraping material in the groove.

12. The material-segregating apparatus defined in claim 1, in which the upper casing section is of circular cross section horizontally, an annular trough extending around the upper portion of the upper casing section into which lighter components of the material are discharged through the opening in the upper portion of the upper casing section, and scraper means movable along said trough for scraping material therein.

13. The material-segregating apparatus defined in claim 1, in which the upper casing section is of circular cross section horizontally, material supplying means including a conduit extending downward in the central portion of the upper casing section to a location adjacent to the central portion of the floor for supplying finely-divided material to the material-holding chamber, means mounting said conduit for rotation about an upright axis, and scraper means connected to said conduit and rotatable thereby around the upper casing section.

14. The material-segregating apparatus defined in claim 1, in which the air supply means includes a propeller located in the lower casing section rotatable about an upright axis, and drive means for rotating said propeller about its axis.

References Cited

UNITED STATES PATENTS

| | | | |
|---|---|---|---|
| 2,095,283 | 10/1937 | Peale | 209—468 |
| 2,099,505 | 11/1937 | Weaver | 209—139 |
| 2,129,244 | 9/1938 | Smith | 209—466 |
| 2,305,344 | 12/1942 | Gary | 209—366 |
| 2,310,894 | 2/1943 | Brusset | 209—467 |
| 2,426,337 | 8/1947 | Bird | 209—467 X |
| 2,586,818 | 2/1952 | Harms | 209—138 X |
| 2,835,388 | 5/1958 | McLean | 209—502 |
| 3,123,551 | 3/1964 | Walker | 209—139 X |
| 3,161,483 | 12/1964 | Morris | 209—466 |

FOREIGN PATENTS

| | | |
|---|---|---|
| 758,775 | 10/1956 | Great Britain. |

HARRY B. THORNTON, *Primary Examiner.*

TIM R. MILES, *Examiner.*